US007041378B2

(12) United States Patent
Van Der Woude

(10) Patent No.: US 7,041,378 B2
(45) Date of Patent: May 9, 2006

(54) HEATING SYSTEM

(75) Inventor: Rene Henk Van Der Woude, Drachten (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 374 days.

(21) Appl. No.: 10/122,741

(22) Filed: Apr. 15, 2002

(65) Prior Publication Data

US 2002/0158059 A1 Oct. 31, 2002

(30) Foreign Application Priority Data

Apr. 17, 2001 (EP) ................................. 01201400

(51) Int. Cl.
*B32B 15/04* (2006.01)

(52) U.S. Cl. .................. 428/450; 428/473.5; 428/704; 428/477.7; 428/447; 428/448

(58) Field of Classification Search ................ 428/435, 428/429, 473.5, 450, 704, 477.7, 447, 448
See application file for complete search history.

(56) References Cited

U.S. PATENT DOCUMENTS 3,359,525 A 12/1967 Hubbuch
5,181,006 A * 1/1993 Shafe et al. .............. 338/22 R
5,298,721 A 3/1994 Smuckler .................... 219/505
5,501,881 A * 3/1996 Fuller et al. ................ 427/421
6,086,791 A * 7/2000 Miller ........................ 252/511
6,223,017 B1 * 4/2001 Akutsu et al. .............. 399/330

FOREIGN PATENT DOCUMENTS

| | | | |
|---|---|---|---|
| DE | 2306250 | | 8/1974 |
| GB | 1416591 | * | 2/1973 |
| JP | 60-124652 | * | 7/1985 |
| WO | WO9617496 | | 6/1996 |

OTHER PUBLICATIONS

Merriam-Webster's Collegiate Dictionary, 10th ed., 1999, p. 56.*

* cited by examiner

*Primary Examiner*—Melanie Bissett

(57) ABSTRACT

A heating system employs a ceramic substrate and a resistive layer. The resistive layer includes a thermally stable resin, which is filled with a conductive material. A method of manufacturing such a heating system involves a provision of a ceramic substrate and an application of a resistive layer on the substrate. In the method, the resistive layer comprises includes a thermally stable resin, which is filled with a conductive material. Before application of the resistive layer, an adhesion promotor is applied on the ceramic substrate.

18 Claims, No Drawings

HEATING SYSTEM

The present invention relates to a heating system employing a ceramic substrate and a resistive layer.

Thick film heating elements in which a ceramic substrate is provided with a resistive layer, are well known such as, for example, thick filed heating elements used in domestic kettles. The element is made by spraying a solution of glass frits on a steel substrate. Subsequently the enamel is fired at a temperature of about 900° C. Then conducting tracks are applied by screen printing a mixture of silver/palladium and glass particles. Again, a firing step is performed in order to achieve a proper bonding between the tracks and the enamel substrate as a result of sintering together of the materials.

The International patent application WO 96/17496 relates to a method of manufacturing a ceramic thick film resistive heating element. The insulating layer comprises enamel and the heat generating layer is usually a silver/glass mixture or a silver/palladium/glass mixture that is sintered to the enamel substrate.

An important disadvantage of the application of silver/palladium tracks is the high price of said metals, which price is also very fluctuating.

It is therefore an aim of the invention to provide for a flat heating system which comprises a ceramic substrate and a resistive layer, which can be manufactured at lower costs and which provides for similar or even better results compared to the known heating systems.

To this end, the present invention provides for a heating system having a resistive layer including a thermally stable resin which is filled with a conductive material.

By using a mixture of a thermally stable resin and a conductive material mixture in order to provide for a heat generating track, a resistive layer with good performance can be manufactured at low costs.

Preferably, the thermally stable resin comprises one or more materials selected from the group consisting of polyimide, polyetherimide, polyethersulfone, aromatic polyamides and silicon resins.

In a preferred embodiment, the thermally stable resin comprises polyimide.

Preferably, the conductive material comprises one or more materials from the group consisting of carbon, graphite, silver, nickel and silver-plated nickel.

In a preferred embodiment, the conductive material comprises carbon.

In particular, the ceramic substrate comprises a glass substrate.

By applying the resistive layer—or heating track—on the glass, a simple heating system is obtained. A possible application for such system is a heating track on a glass jug for a coffeemaker. An important advantage of said heating system is the low power density thereof and the relatively low temperature which prevents overheating of the coffee.

In another advantageous embodiment the ceramic substrate comprises a substrate of steel which is provided with an enamel layer.

An example thereof is a heating element for a domestic kettle.

Preferably, the resistive layer is bonded to the ceramic substrate and an adhesive promotor is interposed between the substrate and the resistive layer.

Said adhesive promotor is used to assist in bonding polyimide to the ceramic substrate.

Advantageously, the adhesive promotor comprises an aminosilane, preferably γ-aminopropyl trimethoxysilane.

The surface properties of materials like enamel and glass are for a major part determined by the quantity of silica in these materials. In order to improve the level of adhesion that can be obtained on said surfaces, aminosilanes are used as an intermediate layer between the substrate and resistive layer. Said aminosilanes act as agents to promote the formation of chemical bonds.

The present invention further relates to an electrical appliance comprising at least a heating system according to the present invention.

Although the heating system according to the present invention can be used for different types of electrical—domestic—appliances, it is especially useful for kettles, coffee makers and tea makers, either as a flat heating element or as a tubular heating element.

The present invention also relates to a method of manufacturing a heating system according to the present invention, said method at least comprising the steps of:

providing a ceramic substrate; and applying a resistive layer on said substrate.

This method is characterized in that the resistive layer comprises a thermally stable resin which is filled with a conductive material.

In order to promote the adhesion between the polyimide layer and the ceramic substrate an adhesion promotor is applied on the ceramic substrate before the step of applying a resistive layer. The adhesion promotor preferably comprises an aminosilane, of which γ-aminopropyl trimethoxysilane is in particular preferred.

The present invention will be further elucidated with reference to the following example.

Preparation of a Heating System for a Kettle

A heating system for a kettle is prepared by the following procedure. First a steel substrate is provided with an enamel insulating layer. The enamel layer contains a relatively large amount of silica. As the adhesion of polyimide onto the silica surface which is covered with hydroxyl groups, is insufficient, the level of adhesion of polyimide must be improved. This is done by modifying the silica surface with an adhesion promotor, in particular an aminosilane.

In order to apply such an adhesion promotor the silica surface of the enamel layer was first subjected to a cleaning procedure. According to the example, said cleaning procedure comprised the steps of:

washing the silica surface with 95% isopropyl alcohol (IPA) (Merck-2 Propanol pro analyze; $C_3H_8O$; M=60.1 g/mol; b.p. 82.4° C.); and air-drying for 10 minutes at 85° C.

Subsequently the adhesion promotor, γ-aminopropyltrimethoxysilane (APS), was spin coated on the IPA cleaned silica layer. To this end a solution of 2% γ-aminopropyltrimethoxysilane in water was used. After drying at room temperature, an extremely thin layer of γ-aminopropyltrimethoxysilane covered the surface of the enamel.

The γ-aminopropyltrimethoxysilane liquid reacts with Si—OH groups on the silica gel surface to form an aminopropyl derivative. The resultant surface acts "sticky", promoting the binding of polyimide film to the silica gel surface. Only a few mono layers of this material need to be applied in order to have this improved adhesion.

After the application of the adhesion promotor a paste of polyamic acid/carbon (PAA/C) was applied using screen printing techniques. As carbon has a relatively low conductivity (0.1–0.01 Ω cm), short and wide tracks can be applied. This makes the design of the track very easy. After drying at 80° C. for 10 minutes another—contacting—layer of polyamic acid/silver (PAA/Ag) can be screen printed. These layers are dried again at 80° C. for 10 minutes followed by a final curing step at 375° C. for 30 minutes. During said final curing step, the polyamic acid (PAA) is transformed into polyimide.

In the above example a method of manufacturing a heating system for a kettle is explained. However, the heating system according to the invention can similarly be applied in other kind of heating elements, such as, for example, a tubular heater. Also the heating system can be applied on a glass jug for a coffeemaker, in which the polyimide/carbon heating track is applied directly on said glass jug.

While the embodiments of the invention disclosed herein are presently considered to be preferred various changes and modifications can be made without departing from the spirit and scope of the invention. The scope of the invention is indicated in the appended claims and all changes that come within the meaning and range of equivalents are intended to be embraced therein.

The invention claimed is:

1. A heating system, comprising:

a ceramic substrate;

an adhesive promotor applied to the ceramic substrate; and a resistive layer applied to the adhesive promotor to thereby bond the resistive layer to the ceramic substrate, wherein the resistive layer includes a thermally stable resin filled with a conductive material; and the ceramic substrate includes a substrate of steel that is provided with an enamel layer.

2. The heating system of claim 1, wherein the thermally stable resin includes one or more materials selected from a group consisting of polyimide, polyetherimide, polyethersulfone, aromatic polyamides, and silicon resins.

3. The heating system of claim 1, wherein the thermally stable resin includes polyimide.

4. The heating system of claim 1, wherein the conductive material includes one or more materials selected from the group consisting of carbon, graphite, silver, nickel and silver-plated nickel.

5. The heating system of claim 1, wherein the adhesive promotor reacts with the ceramic substrate to bind the resistive layer to the ceramic substrate.

6. The heating system of claim 1, wherein the adhesive promotor includes an aminosilane.

7. The heating system of claim 1, wherein the adhesive promotor includes γ-aminopropyl trimethoxysilane.

8. The heating system of claim 1, wherein the heating system is employed within an electrical appliance.

9. The heating system of claim 8, wherein the electrical appliance is one of a coffeemaker or a water kettle.

10. The heating system of claim 6, wherein the heating system is employed within an electrical appliance.

11. The heating system of claim 10, wherein the electrical appliance is one of a coffeemaker or a water kettle.

12. The heating system of claim 7, wherein the heating system is employed within an electrical appliance.

13. The heating system of claim 12, wherein the electrical appliance is one of a coffeemaker or a water kettle.

14. A method of manufacturing a heating system, the method comprising:

providing a ceramic substrate, the substrate comprising an enamel layer on a substrate of steel;

applying an adhesive promotor on the enamel layer of the ceramic substrate; and applying a resistive layer on the adhesive promotor to thereby bond the resistive layer to the ceramic substrate, wherein the resistive layer includes a polyimide filled with a conductive material.

15. The method of claim 14, wherein the adhesive promotor includes an aminosilane.

16. The method of claim 14, wherein the adhesive promotor includes γ-aminopropyl trimethoxysilane.

17. The method of claim 14, wherein the adhesive promotor reacts with the ceramic substrate to bind the resistive layer to the ceramic substrate.

18. A heating system, comprising:

a ceramic substrate with an enamel layer on a substrate of steel;

an adhesive promotor applied to the enamel layer; and a resistive layer applied to the adhesive promotor to thereby bond the resistive layer to the ceramic substrate, wherein the resistive layer includes a thermally stable resin filled with a conductive material.

* * * * *